United States Patent
Reichmuth et al.

(10) Patent No.: US 8,454,357 B2
(45) Date of Patent: Jun. 4, 2013

(54) HOTPLATE WITH LIFTING ELEMENTS

(75) Inventors: Bruno Reichmuth, Euthal (CH); Claudio Meisser, Cham (CH)

(73) Assignee: Komax Holding AG, Dierikon (CH)

( * ) Notice: Subject to any disclaimer, the term of this patent is extended or adjusted under 35 U.S.C. 154(b) by 984 days.

(21) Appl. No.: 12/267,206

(22) Filed: Nov. 7, 2008

(65) Prior Publication Data

US 2009/0139705 A1 Jun. 4, 2009

(30) Foreign Application Priority Data

Nov. 30, 2007 (EP) .................................. 07405341

(51) Int. Cl.
*F27D 5/00* (2006.01)
(52) U.S. Cl.
USPC ........................................ 432/253; 219/443.1
(58) Field of Classification Search
USPC .. 211/41.18; 269/48.2, 54.1, 54.3; 219/443.1, 219/451.1, 460.1, 463.1, 465.1; 432/249, 432/253, 258, 259
See application file for complete search history.

(56) References Cited

U.S. PATENT DOCUMENTS

| | | | |
|---|---|---|---|
| 5,716,207 A * | 2/1998 | Mishina et al. | 432/253 |
| 6,062,852 A * | 5/2000 | Kawamoto et al. | 432/258 |
| 6,635,853 B2 * | 10/2003 | Saito et al. | 219/465.1 |
| 6,644,965 B2 * | 11/2003 | Ookura et al. | 432/253 |
| 6,646,236 B1 * | 11/2003 | Saito et al. | 219/465.1 |
| 6,686,570 B2 * | 2/2004 | Furukawa et al. | 219/465.1 |
| 6,809,299 B2 * | 10/2004 | Hiramatsu et al. | 219/444.1 |
| 7,150,628 B2 * | 12/2006 | Yamaga et al. | 432/247 |
| 7,517,217 B2 * | 4/2009 | Deguchi et al. | 432/253 |
| 2009/0001071 A1* | 1/2009 | Kulkarni | 219/444.1 |

FOREIGN PATENT DOCUMENTS

| | | |
|---|---|---|
| CN | 1801457 A | 7/2006 |
| CN | 1909182 A | 2/2007 |
| CN | 1909183 A | 2/2007 |
| CN | 1958285 A | 5/2007 |
| EP | 678 357 A1 | 10/1995 |
| EP | 0678357 A1 | 10/1995 |
| EP | 1 609 597 A2 | 6/2005 |
| EP | 1 550 548 A1 | 7/2005 |
| WO | 2004030900 A1 | 4/2004 |

OTHER PUBLICATIONS

European Search Report issued in EP 07 40 5341, Apr. 22, 2008, 2 pages.
Supplementary Chinese Search Report for Chinese Application No. 200810180246.6, dated Jun. 21, 2012, 2 pages.

\* cited by examiner

*Primary Examiner* — Gregory A Wilson
(74) *Attorney, Agent, or Firm* — Pillsbury Winthrop Shaw Pittman LLP

(57) ABSTRACT

The hotplate for a workpiece comprises a heatable plate which on a first side comprises a support surface for the workpiece, several lifting elements for the lifting of the workpiece relative to the support surface, wherein each lifting element is moveably arranged in such a manner that the respective lifting element can be retracted with respect to the support surface and/or extended with respect to the support surface and means for heating the plate. The means for heating comprise at least one heating channel which extends on a second side of the plate located opposite the support surface and is filled with a heating fluid. The heating fluid is in contact with the plate. The lifting elements are loaded with the heating fluid in such a manner that the lifting elements are extendable through a predetermined change of the hydrostatic pressure of the heating fluid.

10 Claims, 2 Drawing Sheets

HOTPLATE WITH LIFTING ELEMENTS

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION BY REFERENCE OF MATERIAL SUBMITTED ON A COMPACT DISC

Not applicable

BACKGROUND (1) Field

The invention relates to a hotplate with lifting elements for the lifting of a workpiece to be heated with the hotplate relative to the hotplate.

(2) Description of Related Art

Hotplates of this type are more preferably employed in laminating presses for manufacturing photovoltaic modules.

During laminating a thin usually film-like layer combines with a carrier material. In many cases, for example during the manufacture of photovoltaic modules, it is necessary to carry out the laminating process at elevated temperatures (hot laminating). Here, the workpiece to be processed (i.e. the carrier material covered with the layer to be joined) is generally heated on the support surface of a hot plate to a predetermined temperature and subsequently pressed.

For the laminating process it is important that the temperature distribution on the support surface of the hotplate is as even as possible. Furthermore, it must be possible to temporarily interrupt the heat supply which can for example be achieved by lifting the workpiece relative to the support surface. With some applications the laminating process is conducted in a vacuum. With applications of this type it is practical to arrange and operate the hotplate in an evacuatable chamber.

From EP 0 678 357 A1 a laminating press with a hotplate arranged in an evacuatable chamber is known for example. The hotplate comprises a multiplicity of lifting elements each of which is arranged in a vertical guide hole in a heatable plate and can be extended from the respective guide hole beyond a support surface of the plate in order to be able to lift a workpiece with respect to the support surface. The respective lifting elements can be extended by means of pneumatically actuatable pistons which are arranged in cylinders which extend in the interior of the plate below the support surface. For actuating the respective piston the pressure differential between the evacuatable chamber and the surroundings is utilised, wherein all lifting elements which are covered by the respective workpiece are automatically lifted when a vacuum is generated in the chamber. This hotplate has a number of disadvantages. Because of the many cylinders which have to be created in the interior of the plate for the pistons the manufacture of the hotplate is expensive. Furthermore, the multiplicity of cylinders and the airflows created when actuating the cylinders result in an uneven temperature distribution in the region of the support surface. In addition, the lifting of the workpiece is connected to the establishment of a vacuum in the chamber. The time which is available for heating a workpiece can thus not be chosen independently of the establishment of the vacuum and thus not freely. A further disadvantage must be seen in that the pneumatic actuation of the pistons renders simultaneous lifting of the lifting elements more difficult. In order to enforce simultaneous lifting of the lifting elements the lifting elements and pistons can be connected with one another. This would make the manufacture of the hotplate even more expensive.

From EP 1 550 548 A1 a further laminating press with a hotplate arranged in an evacuatable chamber is known. The hotplate is arranged at a distance from the base of the chamber and comprises a multiplicity of vertical bores. In order to be able to lift a workpiece resting on the hotplate a multiplicity of lifting devices is provided each of which consists of a pin and a drive for the respective pin. The drives are individually arranged on the base of the chamber below the hotplate in such a manner that the respective pins can be guided or extended through the bores in the hotplate. For example pneumatic cylinders or mechanical drives are provided as drives. This arrangement of hotplate and lifting devices is also associated with several disadvantages. On the one hand because of the multiplicity of the drives, expensive measures are required in order to be able to operate and control the drives in the vacuum, in particular measures for sealing the drives and the chamber. Furthermore, the assembly of the lifting devices and the hotplate are expensive, in particular in the case of relatively large plates and a large number of lifting devices. In addition, the maintenance of the drives is made more difficult, more so since these are not easily accessible below the plate. Furthermore, simultaneous extending of all pins is associated with considerable expenditure because of the multiplicity of the drives, more so since all drives have to be synchronised.

BRIEF SUMMARY

The present invention is based on the object of avoiding the mentioned disadvantages and creating a hotplate which makes it possible to create as even as possible a temperature distribution in the region of a support surface of the hotplate and to simultaneously lift with simple means a workpiece placed on the hotplate with respect to all regions of the workpiece which are in, contact with the hotplate.

This object is solved through a hotplate with the characteristics of Patent Claim 1.

The hotplate comprises: a heatable plate which on a first side comprises a support surface for a workpiece; several lifting elements for lifting the workpiece relative to the support surface, wherein each lifting element is moveably arranged in such a manner that the respective lifting element can be retracted with respect to the support surface and/or extended with respect to the support surface; and means for heating the plate.

According to the invention the means for heating the plate comprise at least one heating channel which extends on a second side of the plate located opposite the support surface and which is filled with a heating fluid, wherein the heating fluid is in contact with the plate and the lifting elements are loaded with the heating fluid in such a manner that the lifting elements are extendable through a predetermined change of the hydrostatic pressure of the heating fluid.

"Heating fluid" in this connection is considered any fluid which is capable of giving off heat to the plate, for example a fluid which is heated with heating elements.

Since the plate at least in the vicinity of all lifting elemeats on the side located opposite the support surface is in contact with the heating fluid, the prerequisite that even heating of the plate can be achieved is provided. If applicable, the heating fluid can circulate in the heating channel and provide balancing of temperature fluctuations thereby. To optimise the respective temperature distribution the lifting elements can be distributed as evenly as possible over the entire support surface. Accordingly, the heating channel can be suitably arranged relative to the lifting elements and optimised with respect to the size of the contact area between the plate and the heating fluid.

Since the heating fluid (compared to gases) must be considered incompressible, all lifting elements which are loaded with the heating fluid of a heating channel can be simultaneously extended independently of the number of lifting elements and the size of the hotplate through a change of the hydrostatic pressure of the heating fluid. In this manner a workpiece placed on the hotplate can be lifted simultaneously with respect to all regions of the workpiece which are in contact with the hotplate. Simultaneous extending or retracting of all lifting elements can be simply achieved, especially since merely one parameter—the hydrostatic pressure of the heating fluid—has to be changed. A suitable change of the hydrostatic pressure can be controlled with simple means, for example with a conventional pump or through a mechanical displacement of the heating fluid.

With an embodiment of the hotplate according to the invention the respective lifting elements are arranged in a guide hole passing through the plate, which terminates in the heating channel. The lifting element can comprise a piston and be arranged so that at least one piston surface is in contact with the heating fluid. With this embodiment the piston or the lifting element can be sealed with a sealing element relative to the respective guide hole in which the lifting element is arranged.

A further embodiment is based on exchangeable modules each of which can be inserted in a channel passing through the plate and which consist of one or several lifting elements and a support structure with guide holes for the respective lifting elements, said support structure being insertable in the channel. Such modules can be realised so that each module can be replaced as a whole from the support surface of the plate. This facilitates the maintenance and if applicable a repair of the lifting elements and the other exchangeable components.

With a further development of this embodiment it is provided that the respective lifting element comprises a piston with a piston surface which is loaded with the heating fluid. The piston can also protrude into the heating channel.

The modules mentioned above simplify sealing with respect to the heating fluid. The piston can for example be sealed with a deformable sealing element (e.g. with a flexible bellows, for example of metal) which forms a connection between the lifting element or the piston and the support structure, so that the guide hole for the respective lifting element is sealed with respect to the heating fluid. Such a sealing element can be attached on a side on the support structure outside the guide hole and on the other side on the lifting element or the piston so that no heating fluid is able to enter the guide hole.

In this case it is not necessary within the guide hole to arrange a sealing element between the lifting element and the wall of the guide hole so that the sealing element upon a movement of the lifting element has to perform a sliding movement relative to the lifting element or relative to the guide hole within the guide hole. Sliding sealing elements between two parts moved relative to each other which, in addition to the proximity of the heating fluid, can be exposed to intense temperature and pressure fluctuations, are not required in this case. In particular, it is possible to omit rubber seals which can be overloaded through major temperature and pressure fluctuations.

The respective lifting element can be connected with a spring element which is preloaded in such a manner that the lifting element is retracted with respect to the support surface when the hydrostatic pressure of the heating fluid is below a predetermined value. The preload of the spring element ensures that the lifting element with low hydrostatic pressure is retracted and can assume a stable position of equilibrium. In order to extend the lifting element a force which at least overcompensates the preload of the spring element is thus required. This construction is advantageous among other things in view of using the hotplate in a vacuum. The preload of the spring element can always be selected so that with a predetermined pressure in the vicinity of the hotplate (outside the heating channel) the lifting element is retracted with respect to the support surface when the hydrostatic pressure drops below a predetermined value.

The arrangement of the heating channel on the side of the plate which is opposite the support surface of the plate offers the advantage that for realising the heating channel no bores through the plate have to be established. For realising a heating channel a two-part construction is recommendable with which the heating channel on one side is limited by the plate and on the other side by a wall attached to the plate. The respective connections between the wall and the plate can generally be realised with conventional means so that they are tight with respect to the heating fluid. This allows costeffective manufacturing of the respective heating channel.

BRIEF DESCRIPTION OF THE DRAWINGS

Further details of the invention and more preferably exemplary embodiments of the invention are explained in the following by means of the enclosed drawing. It shows.

DETAILED DESCRIPTION

Figure 1:
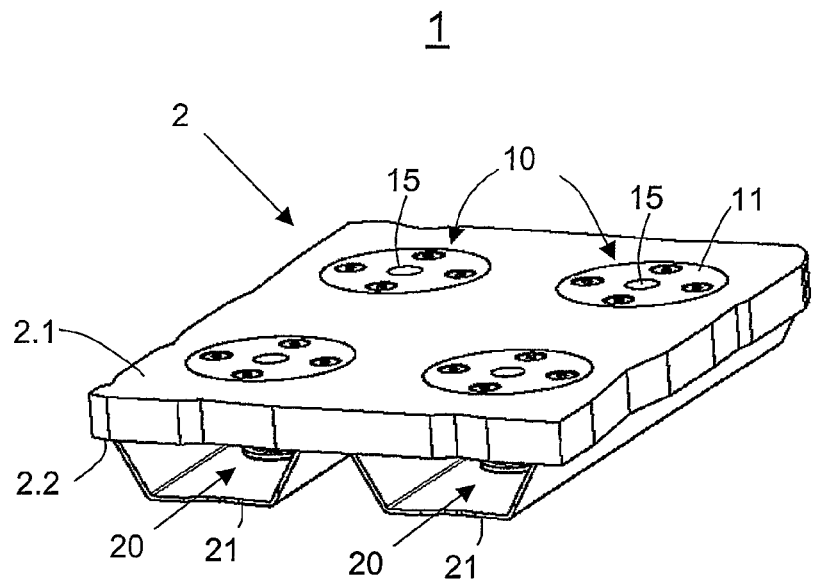
FIG. 1 a perspective view of a detail of an embodiment of the hotplate according to the invention.
Figures 2, 3:
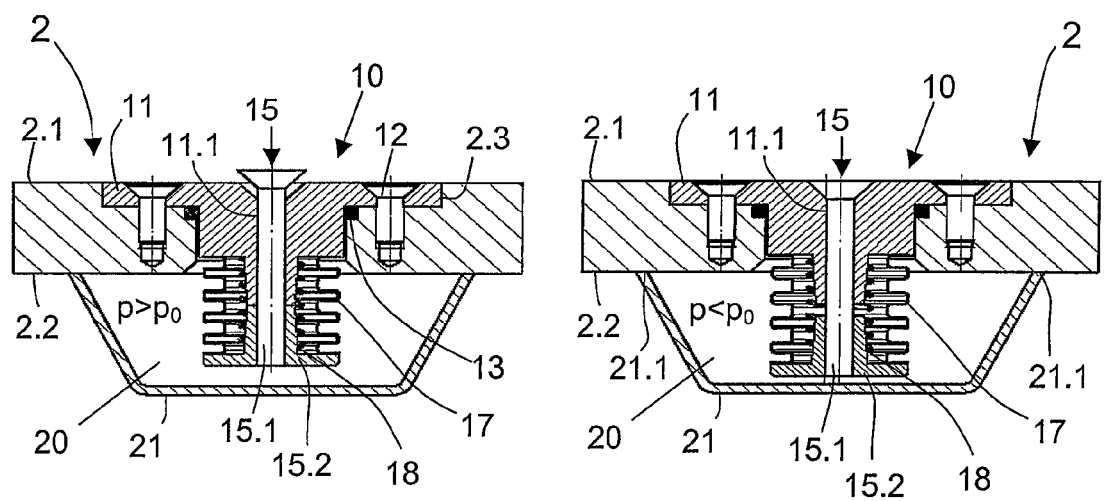
FIG. 2 the hotplate according to FIG. 1, in a section through a lifting element, wherein the lifting element is shown in the extended state.
FIG. 3 the hotplate according to FIG. 1, in a section through a lifting element, wherein the lifting element is shown in the retracted state.

FIGS. 1-3 show various representations of a hotplate 1 according to the invention. The hotplate 1 comprises a heatable plate 2, which on an (upper) first side comprises a flat support surface 2.1 for a workpiece to be heated.

In the region of a surface 2.2, which is formed on a second (lower) side located opposite the support surface 2.1 the plate 2 comprises a heating channel 20 which is filled with a heating fluid. As is shown in FIG. 1 the heating channel 20 is composed of several segments which in the case of the detail of the hotplate 1 shown in FIG. 1 run parallel with respect to each other and have a distance to one another. Such segments can be arranged distributed over the entire surface 2.2 and be connected with one another at various points so that circulation of the heating fluid throughout the entire heating channel 20 is possible.

In the present case the surface 2.2 is a flat surface. The heating channel 20 is limited on one side through a region of the surface 2.2 and on another side through a wall 21 which in the present case consists of a shaped part with trapezoidal profile. The exact shape of the profile is not relevant in this context. It is merely significant that the heating fluid is in contact with a part region of the surface 2.2 which is large enough in order to guarantee a defined heat flow within the scope of predetermined tolerances.

The wall 21 is connected with the plate 2 on two edges 21.1 in such a manner that the heating channel in the region of the edges 21.1 is tight for the heating fluid. The wall 21 can for example be a sheet metal construction. It can for example be welded on the edges 21.1 to the plate 2. Alternatively it is possible to screw the wall 21 together with the plate 2 and seal it if required.

As indicated by FIGS. 1-3 the hotplate 1 in the region above the heating channel 20 comprises a multiplicity of modules 10 which are inserted in channels 2.3. The channels 2.3 pass through the plate 2 and terminate on the surface 2.2 in the heating channel 20.

Each module 10 comprises a support structure 11 with a guide hole 11.1 for a lifting element 15 formed in the centre of the support structure 11. The channels 2.3 are formed in such a manner that the support structure 11 of a module 10 positively fits in one of the channels 2.3 and can be inserted in the respective channel 2.3 from the support side 2.1 of the plate 2 and attached to the plate 2 with removable fasteners 12 (for example screws). As is shown in FIGS. 1-3 the upper side of the support structure 11 ends flush with the support surface 2.1 when the respective module 10 is inserted in the channel 2.3. As is shown in FIG. 2 the respective support structure 11 can be sealed against the plate 2 with an O-ring 13.

As is shown by FIGS. 2 and 3 the guide hole 11.1 is a bore which passes through the support structure 11 and runs vertically to the support surface 2.1.

The lifting elements 15 consist of a longish pin 15.1 whose one end is guided in the guide hole 11.1 in the longitudinal direction of the guide hole 11.1 and whose other end protrudes into the heating channel 20 and of a piston 15.2 which sits on this other end of the lifting element 15.1 and is securely connected with the pin 15.1.

As is shown by FIGS. 2 and 3 the respective lifting element 15 is moveable in the longitudinal direction of the guide hole 11.1. According to FIG. 2 the lifting element 15 can be extended from the guide hole 11.1 by a defined stroke. This stroke is limited in that the support structure 11 forms a mechanical stop for the piston 15.2. The maximum stroke is thus reached when the piston 15.2 strikes the support structure 11 (FIG. 2). As is shown by FIG. 3 the lifting element can be moved in the reverse direction (i.e. in the direction of the heating channel 20) so far until a conically shaped head of the lifting element strikes the support structure 11. In this position the lifting element 15 is retracted in the guide hole 11.1 in such a manner that the head of the lifting element 15 borders flush on the support surface 2.1 (FIG. 3).

The piston 15.2 protrudes in the heating channel 15 and is loaded with the heating fluid. It is thus possible to move the piston 15.2 and thus the lifting element 15 through a change of the hydrostatic pressure p of the heating fluid.

According to FIGS. 1 and 2 the piston 15.2 is connected with the support structure 11 via a deformable bellows, preferentially via a bellows 17 of metal. The bellows 17 seals the guide hole 11.1 against the heating fluid. The bellows 17 can furthermore be designed so that it is preloaded in the longitudinal direction of the pin 15.1, preferably so that the bellows 17 pushes the lifting element 15 into the retracted state according to FIG. 3. Furthermore a spring element 18 (coil spring) is arranged between the support structure 11 and the piston 15.2 in such a manner that it is subjected to a compressive load. Under these circumstances the spring element 18 likewise pushes the lifting element 15 into the retracted state.

The preloads of the bellows 17 and the spring element 18 are selected so that the lifting element 15 is retracted with respect to the support surface 2.1 when the hydrostatic pressure p of the heating fluid is below a predetermined value $p_0$ (FIG. 3). If the hydrostatic pressure p exceeds the value $p_0$ by a predetermined differential $\Delta p$, the lifting element 15 reaches the maximum stroke and assumes the extended state (FIG. 2).

Figure 4:
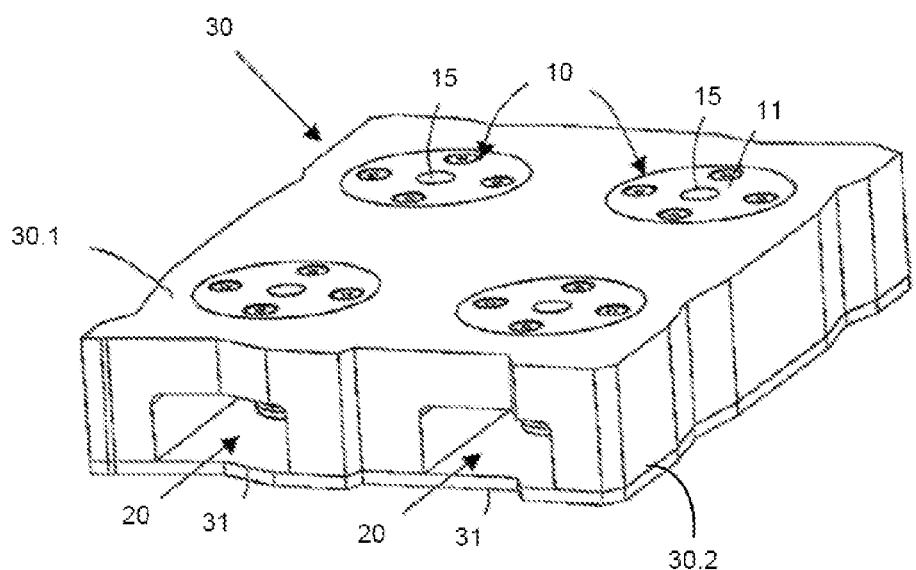
FIG. 4 a perspective view of a detail of another embodiment of the hotplate according to the invention.

FIG. 4 shows a further version of the hotplate according to the invention comprising a plate 30 with a support surface 30.1 for a workpiece with a multiplicity of modules 10 and a heating channel 20 which is formed on the side 30.2 of the plate 30 located opposite the support surface 30.1. Compared with the embodiment according to FIGS. 1-3 the heating channel 20 is formed in a slot which is located on the side of the plate 30 located opposite to the support surface 30.1 and is covered by a wall 31. Compared with wall 21 the wall 31 is flat.

The exemplary embodiments shown in FIGS. 1-4 can be variously modified. The support surfaces 2.1 and 30.1 for example need not necessarily be flat. The heatable plates 2 and 30 can also be provided with several heating channels 20 which are separate from one another. It is also conceivable to equip each of various part regions of the support surfaces with lifting elements which are extendable over variously long distances with regard to the respective support surface.

What is claimed is:

1. A hotplate for a workpiece, comprising:
    a heatable plate having a first side and a second side, wherein the first side comprises a support surface for the workpiece;
    lifting elements for lifting the workpiece relative to the support surface, wherein each lifting element is moveably arranged so as to be retractable with respect to the support surface and/or extendable with respect to the support surface; and
    at least one heating channel which extends on the second side of the plate located opposite the support surface and is filled with a heating fluid,
    wherein the heating fluid is in contact with the plate, and each lifting element is arranged in a guide hole passing through the plate and comprises a piston which is loaded with the heating fluid such that the lifting element is extendable through a predetermined change of the hydrostatic pressure of the heating fluid.

2. The hotplate according to claim 1, wherein the guide hole terminates in the heating channel.

3. The hotplate according to claim 1, wherein each lifting element is connected with a spring element, which is preloaded such that the lifting element is retracted with respect to the support surface when the hydrostatic pressure of the heating fluid is below a predetermined value.

4. The hotplate according to claim 1, wherein the heating fluid in the heating channel is enclosed between an area region on the second side of the plate and a wall attached to the plate.

5. The hotplate according to claim 4, wherein the wall is welded together with the plate.

6. A hotplate for a workpiece comprising:
    a heatable plate having a first side and a second side, wherein the first side comprises a support surface for the workpiece;

lifting elements for lifting the workpiece relative to the support surface, wherein each lifting element is moveably arranged so as to be retractable with respect to the support surface and/or extendable with respect to the support surface;

at least one heating channel which extends on the second side of the plate located opposite the support surface and is filled with a heating fluid being in contact with the plate; and at least one exchangeable module which is inserted in a channel which passes through the plate, wherein the module comprises a support structure with at least one guide hole for at least one of the lifting elements and at least one of the lifting elements is arranged in each guide hole, said module being insertable in the channel, wherein each lifting element comprises a piston which is loaded with the heating fluid such that the lifting element is extendable through a predetermined change of the hydrostatic pressure of the heating fluid.

7. The hotplate according to claim 6, further comprising a deformable sealing element, which forms a connection between the piston and the support structure so that the guide hole is sealed with respect to the heating fluid.

8. The hotplate according to claim 7, wherein the sealing element is a bellows comprised of metal.

9. The hotplate according to claim 6, wherein each lifting element is connected with a spring element, which is preloaded such that the lifting element is retracted with respect to the support surface when the hydrostatic pressure of the heating fluid is below a predetermined value.

10. The hotplate according to claim 6, wherein the heating fluid in the heating channel is enclosed between an area region on the second side of the plate and a wall attached to the plate.

* * * * *